US012602117B1

(12) United States Patent　　　　(10) Patent No.:　US 12,602,117 B1

Koh et al.　　　　　　　　　　　　　(45) Date of Patent:　　Apr. 14, 2026

(54) TOUCH JOYSTICK

(71) Applicant: BLASTIC, Seoul (KR)

(72) Inventors: Hyunjin Koh, Seoul (KR); Woojin Koh, Seoul (KR)

(73) Assignee: BLASTIC (KR)

( * ) Notice: Subject to any disclaimer, the term of this patent is extended or adjusted under 35 U.S.C. 154(b) by 0 days.

(21) Appl. No.: 18/912,384

(22) Filed: Oct. 10, 2024

(30) Foreign Application Priority Data

Oct. 25, 2023　(KR) ........................ 10-2023-0143417

(51) Int. Cl.
　*G06F 3/0338*　　(2013.01)
　*G05G 9/047*　　(2006.01)
　*G06F 3/038*　　(2013.01)
　*G06F 3/041*　　(2006.01)

(52) U.S. Cl.
　CPC ........... *G06F 3/0338* (2013.01); *G05G 9/047* (2013.01); *G06F 3/038* (2013.01); *G06F 3/04162* (2019.05); *G05G 2009/04722* (2013.01)

(58) Field of Classification Search
　CPC .. G06F 3/0393; G06F 3/04886; G06F 3/0338; G06F 3/0362; G06F 3/044; G06F 2203/04809; G06F 3/041; G06F 3/0412; G06F 3/016; G06F 3/0443; G06F 3/03547; G06F 3/03548; G06F 3/0416; G06F 3/04162; G06F 3/0446; A63F 13/2145; A63F 13/24; A63F 13/98
　See application file for complete search history.

(56) References Cited

U.S. PATENT DOCUMENTS

| | | | |
|---|---|---|---|
| 9,024,908 B2 * | 5/2015 | Sinclair ................... | G06F 3/016 |
| | | | 345/173 |
| 9,170,658 B2 * | 10/2015 | Quek .................... | G06F 3/0338 |
| 9,502,193 B2 | 11/2016 | Niu et al. | |
| 11,269,470 B2 * | 3/2022 | Mori ..................... | G06F 3/0447 |
| 2013/0215029 A1 * | 8/2013 | Comer, Jr. ........... | G06F 3/0393 |
| | | | 345/161 |
| 2014/0077911 A1 * | 3/2014 | Raisch ................... | G06F 3/017 |
| | | | 29/469 |
| 2015/0270073 A1 | 9/2015 | Yarak, III et al. | |

OTHER PUBLICATIONS

Nelson Miller, Dome Switches What are Dome Switches, Sep. 13, 2017, https://nelson-miller.com/what-are-dome-switches/, accessed Oct. 24, 2024, 7pg.

* cited by examiner

*Primary Examiner* — Koosha Sharifi-Tafreshi

(74) *Attorney, Agent, or Firm* — FOLEY & LARDNER LLP

(57)　　　　　　ABSTRACT

A physical input device for use with a touch screen of an electronic device may include a fixed part attachable to the electronic device, and a moving part movable relative to the fixed part. The moving part may include a finger part for receiving user input, and a touch part for contacting the touch screen. The moving part may be configured to move horizontally to generate a first touch input on a first area of the touch screen. The moving part may be configured to move vertically to generate a second touch input on a second area of the touch screen, the second area being separate from the first area.

10 Claims, 14 Drawing Sheets

Physical input device 300

Finger part 311
Middle shaft 313

Hole 321

Touch part 312

Glue together

Fixed elastic member 325

Completely fixed part 329

Vertical movement gap 322　Attachment part 341　Lower vertical touch layer or touch point 328

Completely fixed part 329

Upper vertical touch layer 326

Middle vertical touch layer 327

Vertical movement gap 322

Glue together

Fixed elastic member 325

Touch screen 150

Middle vertical touch layer 327

Attachment part 341

Touch point 328

<Lower portion of fixed part 320 seen from different viewing angle>

(a) Horizontal motion (b) Vertical press

\* PoC = proof of concept (a) Fixed part with magnetic parts (b) PoC top view

Attachment part
341

Touch part
312

331

328

Sponge &
conductive fabric (c) PoC bottom view

Touch screen 150

Trigger button 120

Virtual joystick 110

(a) The screen of a smartphone game

328

312

The touch part 312 and the touch point 328 are attached
to the virtual joystick 110 and the trigger button 120

(b) Input device 300 attached to smartphone 328 is apart from the trigger button 120

(c) Horizontal joystick control

Pressing the moving part 310 makes the 328 to touch the trigger button 120

(d) Vertical trigger

Upper vertical touch layer 326

329

Space 3211

Magnetic part 324

Completely fixed part 329 a) Fixed part 320

Magnetic part 324

Upper vertical touch layer 326

Space 3211

Completely fixed part 329

Attachment part 341

Fixed Elastic member 325 b) Fixed part from different viewing angle (c) Combined fixed part 320 and moving part 310 a) Fixed part 320 - upper magnetic part separated b) Fixed part 320 - upper magnetic part assembled c) User pressing the finger part 311 (of moving part 310)

(a) Compound touch point in neutral state (b) Compound touch point in active touch state

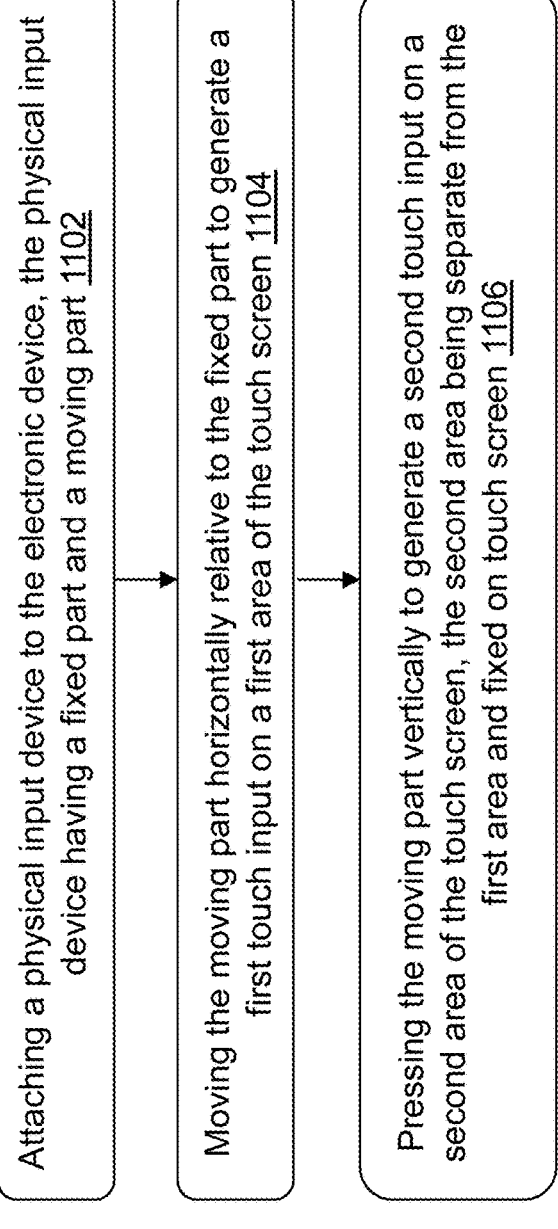

1100

Attaching a physical input device to the electronic device, the physical input device having a fixed part and a moving part 1102

Moving the moving part horizontally relative to the fixed part to generate a first touch input on a first area of the touch screen 1104

Pressing the moving part vertically to generate a second touch input on a second area of the touch screen, the second area being separate from the first area and fixed on touch screen 1106

FIG. 11

TOUCH JOYSTICK

BACKGROUND TO RELATED APPLICATIONS

This application claims the benefit of priority to Korean Patent Application No. 10-2023-0143417, filed Oct. 25, 2023, the disclosure of which is hereby incorporated by referenced for all purposes.

TECHNICAL FIELD

The present disclosure relates to systems and methods for providing a mechanical input device via touch sensors on a touch screen of an electronic device.

BACKGROUND

There is a need for improving the process of user input on a touch screen of electronic device such as smartphones or tablets.

BRIEF DESCRIPTION OF THE DRAWINGS

These and other aspects and features of the present implementations will become apparent to those ordinarily skilled in the art upon review of the following description of specific implementations in conjunction with the accompanying figures, wherein:

FIG. 11 is an example flowchart for performing a process of providing a physical input device for use with a touch screen of an electronic device, according to some implementations.

DETAILED DESCRIPTION

According to certain aspects, implementations in the present disclosure relate to a system and a method for providing a mechanical input device via touch sensors on a touch screen of an electronic device.

Some embodiments of the present disclosure relates to a mechanical input device that improves the process of user input via touch sensors on the touch screen of electronic device (e.g., electronic device 100) such as smartphones or tablets. Hereafter, for convenience, such electronic devices as a whole will be referred to by any one term such as 'phone', 'tablet' or 'electronic device'.

Figure 1:
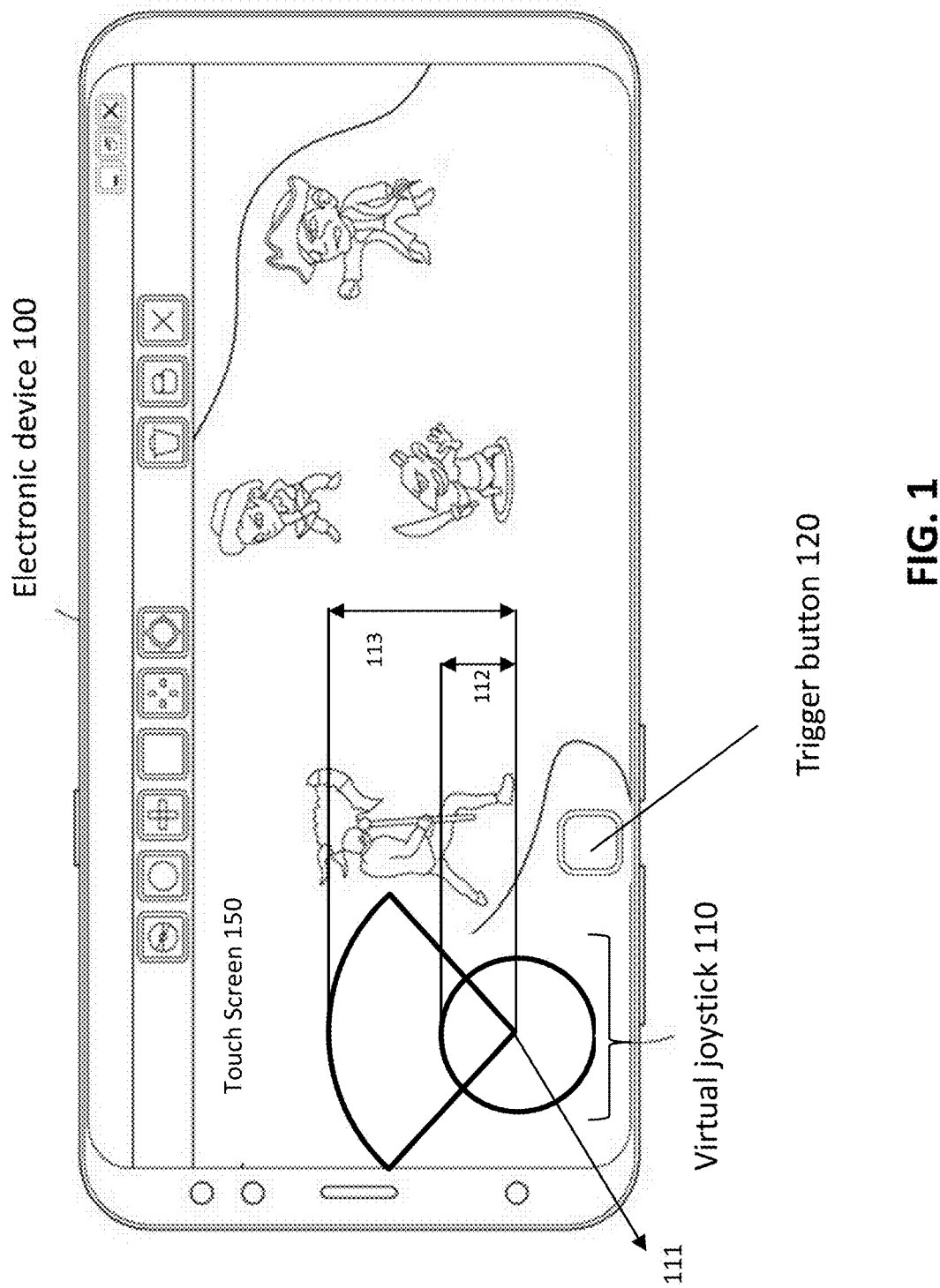
FIG. 1 is a block diagram illustrating an example electronic device according to some implementations.

Referring to FIG. 1, an electronic device 100 is shown to explain the environment in which an input device according to some embodiments of the present disclosure is attached to. In some embodiments, the electronic device 100 can display a virtual control pad or virtual joystick 110 in the lower left corner of the touch screen 150 along with the game scene being played out. In some embodiments, when a touch starts from the center 111 of the displayed virtual control pad (e.g., virtual joystick 110) and moves towards the circular periphery at a distance of radius 112, the character in the game scene can be made to move in the direction of movement. In some of the mobile phone games, moving a distance 113 greater than 112 towards the top of the phone can make the character move faster to enter a run or sprint state. Also, some of the games support diagonal-direction sprint along with the strict forward sprint, i.e., running in the direction of −45 degrees to +45 degrees from the strict forward direction. To support this multi-direction sprint, in some embodiments, the virtual joystick can be in the form of a union of a circle with a radius 112 and a fan-shape with a radius 113 larger than the diameter 112 of the circle.

Figure 2:
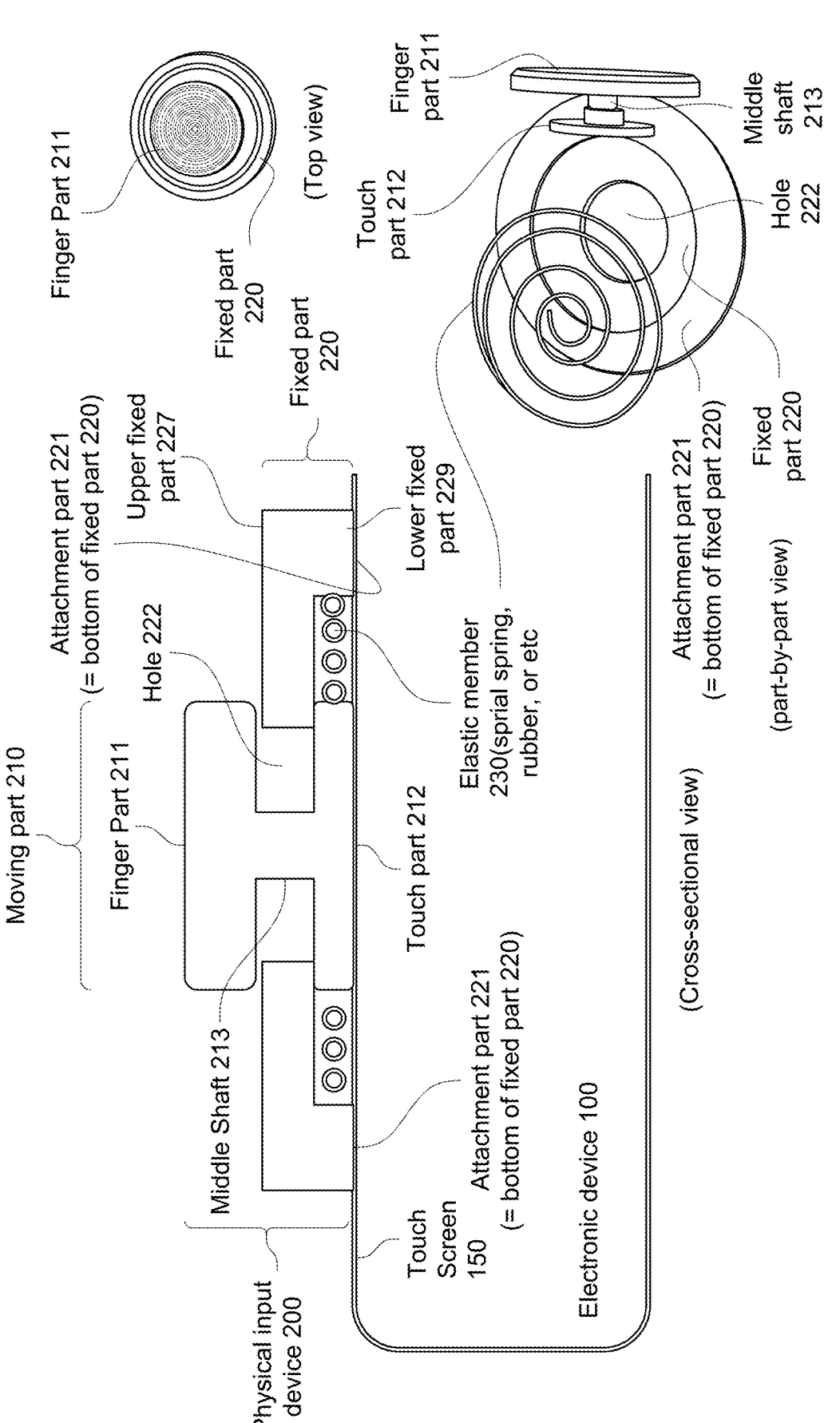
FIG. 2 is a block diagram illustrating an example electronic device including a conventional physical input device.

Users can also tap or touch the displayed trigger button 120 to trigger specific events in the game. While such input through a virtual control pad or joystick displayed on the screen 110 can provide a user interaction with games played on electronic devices, it cannot provide the level of tactile feedback provided by an actual physical control pad. Therefore, a conventional physical input device 200 as shown in FIG. 2 can be mounted on the joystick displayed on the screen. This input device can effectively provide physical tactile feedback.

FIG. 2 shows a conventional physical input device, a joystick or physical input device 200. The cross-sectional view includes a moving part 210 and a fixed part 220 as major components of the physical input device 200. The fixed part 220 is a component that limits the movement of the moving part 210 to the virtual joystick area by attaching itself to the electronic device 100. There are various ways to attach this to the electronic device 100. For example, in the case of FIG. 2, there is an attachment part 221 at the bottom of the fixed part so that the joystick can be attached to the touch screen 150 of the electronic device 100. The attachment part 221 can be made of a viscous material such as high-viscosity or low-hardness silicone that can be reattached multiple times, or it can be implemented to be attached with sufficient strength using air pressure such as a suction cup and can be detached and attached multiple times, or it can be fixed by wrapping around the top, side, and bottom of the phone (electronic device 100) with a C-shaped grip or clip protruding from the side of the fixed part 220 to surround the side of the electronic device 100.

The moving part 210 in FIG. 2 is placed on the virtual joystick area 110 of touch screen 150 of the electronic device 100 restricted by the fixed part 220. The moving part 210 consists of the following sub-parts: First, at the top of the moving part is a finger part 211 where the user places their finger to push the moving part 210 as a whole, and at the bottom is the touch part 212 that touches and moves on the touch screen to generate touch input on virtual joystick 110.

The moving part 210 can be configured to provide capacitance that can cause touch input on a capacitive touch screen 150, either by connecting the finger part 211 in contact with the user's hand to the lower touch part 212 touching the touch screen with a conductor, or by its own electrical properties. If the touch screen 150 is resistive, a conductive configuration is not necessary, and the lower touch part 212 of the moving part 210 is composed of a stylus mechanism so that pressure is effectively input to the touch screen 150 by the stylus mechanism. In any case, the lower part or the touch part 212 of the moving part 210 contacts the touch screen to cause touch input.

FIG. 2 is configured so that the moving part 210 does not escape from the hole 222 of the fixed part 220. There is a hole 222 in the center of the upper part of the fixed part or upper fixed part 227, and the moving part 210 is composed of an upper part (finger part 211) and a lower part (touch part 212) that cannot escape through hole 222 of the fixed part 220 due to its size or shape, and is fitted to the fixed part 220 by being connected with a middle shaft 213 above and below the hole 222. Therefore, the moving part 210 cannot escape from the fixed part 220, but the hole 222 is sufficiently larger (in diameter) than the middle shaft 213, so the user can slide the finger part 211 horizontally with sufficient clearance by pushing or pulling it. At this time, when the radius of the hole 222 is H and the radius of the middle shaft 213 is A, the center of the moving part 210 (or the touch part 212) including the finger part is at the neutral position, which is the center of the fixed part 220, when no external force is applied, and when an external force is applied to the finger part 211 by user's finger, it can move by a length of H-A in the direction of the external force, and it is preferable that this movable width H-A matches or is slightly larger than the radius 112 of the virtual joystick shown in FIG. 1.

In the conventional phone-attached joystick shown in FIG. 2, the fixed part 220 and the moving part 210 are connected using the elastic member 230 such as spring or rubber to generate a force that sends the moving part 210 back to the neutral position in the center with the restoring force of the elastic member, so that when no external force is applied to the finger part 211, the moving part 210 returns to the neutral position in the center, and the user can enjoy the game more accurately and comfortably by receiving the force trying to return to the neutral position as tactile feedback through their finger during joystick operation. In FIG. 2, the fixed part 220, which is composed of one piece, can also be divided into the upper fixed part 227 and the lower fixed part 229. The spring (or the elastic member) 230 that returns to the neutral position is installed in the internal space of the lower fixed part 229, with the outer winding of the spiral spring 230 surrounding the inner wall of the lower fixed part 229 so that the spring is installed in the lower fixed part 229, and the innermost winding of the spring wraps around the middle shaft 213 or touch part 212 of the moving part 210 to exert elasticity to return to the neutral position between the fixed part 220 and the moving part 210.

Figure 3:
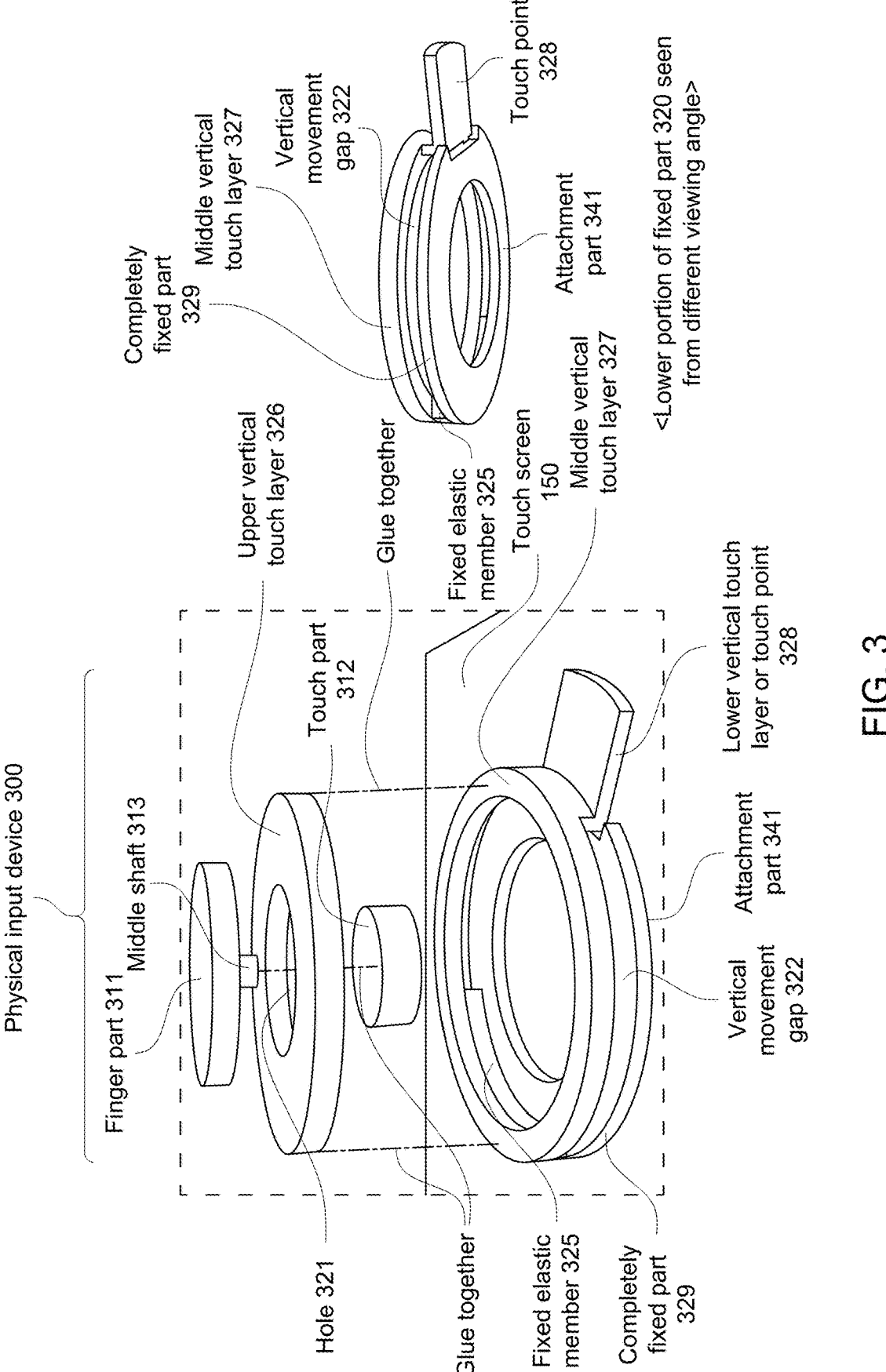
FIG. 3 is a block diagram illustrating an example physical input device according to some implementations.

In some embodiments of the present disclosure, a physical input device 300 is disclosed that moves horizontally over a virtual joystick 110 for directional control while simultaneously allowing vertical press of the input device 300 to generate a touch input on a trigger button 120 located separately from the virtual joystick 110 on touch screen 150. As shown in FIG. 3, this physical input device 300 comprises a fixed part 320 and a moving part 310 (see FIG. 4A and FIG. 4B), each serving roles analogous to the fixed part 220 and moving part 210 in the conventional joystick shown in FIG. 2 to generate horizontal direction control touch input on the virtual joystick 110 displayed on touch screen 150.

In some embodiments, the fixed part 320 of this new input device 300 is composed of a greater number of sub-parts than the fixed part 220 to enable not only horizontal movement of the moving part 310, but also to provide touch input at a separately-located trigger button 120 when the input device 300 is pressed vertically by a finger. All components with numbers starting with 32, such as the vertical touch layers 326, 327, and 328, are elements of the fixed part 320 and all components whose numbers starting with 31, such as finger part 311, middle shaft 313, touch part 312 are elements of the moving part 310.

As shown in FIG. 3, in some embodiments, the fixed part 320 includes the completely fixed part 329, a fixed elastic member 325, and the vertical touch layers 326, 327, 328.

In some embodiments, the completely fixed part 329 serves the role of the aforementioned fixed part 229, attaching the input device 300 of some embodiments of the present disclosure to the phone 100 through an attachment part 341 made of sticky material or grip, etc. In some embodiments, the completely fixed part 329 also acts as a reference point, ensuring that when the moving part 310 returns to the neutral position, the touch part 312 aligns with a predetermined position on the touch screen, such as the center of the displayed joystick 110.

In some embodiments, the upper vertical touch layer 326 includes a hole 321 that connects to the moving part 310 and defines the range of horizontal movement for the moving part 310. In some embodiments, the upper vertical touch layer 326 allows the moving part 310 to slide against it to implement horizontal movement (See also FIG. 4A).

In some embodiments, the difference from the previously mentioned upper fixed part 227 is that the fixed part 320 not only has the completely fixed part 329, it is now composed of fixed elastic member 325, vertical touch layers 326, 327, 328 and vertical movement gap 322.

In some embodiments, the moving part 310 inserted into the hole 321 of the fixed touch part not only moves horizontally to cause the touch input on the virtual joystick 110, but when the finger part 311 of the moving part 310 is pressed vertically, the vertical touch layers 326, 327, 328 are pressed along with the finger part 311, moving downward towards the touch screen as much as vertical movement gap 322 and other mechanical dimensions allow.

In some embodiments, the fixed elastic member 325 connects the completely fixed part 329 and the vertical touch layers 326, 327, 328. In some embodiments, the fixed elastic member 325 has elasticity, so when the moving part 310 (e.g., finger part 311) is pressed vertically by the user and thus the vertical touch layers underneath are pressed, the fixed elastic part 325 deforms, allowing the entire vertical touch layers 326, 327, 328 to move down, creating a touch input at touch point 328 (or lower vertical touch layer 328). (See also FIG. 4B.) Consequently, the touch point 328, located separately from the touch part 312 of the moving part 310, touches the touch screen, causing a separate touch input on such area as trigger button 120. Although not shown in FIG. 3, in some embodiments, a spring (e.g., elastic part) can be placed between the lower portion of the moving part 310 and the lower portion of the fixed part 320 as in FIG. 2 to bring the moving part to a central neutral position when no external force is applied.

In some embodiments, when the force pressing the moving part 310 disappears, the vertical touch layers 326, 327, 328 returns to its original neutral position due to the restoring force of the fixed elastic part 325. In some embodiments, the fixed elastic part 325 can be made of materials with elasticity such as coil/spiral/plate springs or silicone rubber, but as shown in FIG. 3, it only needs to provide enough elasticity for the vertical touch layers to move up and down within a relatively small gap 322 of less than 1 mm when pressed, sufficient to touch the touch screen and create a touch input, and then separate from the touch screen when the pressure is released. Therefore, the portion of the plastic structure used for the entire fixed part 320 as one piece can be used as the fixed elastic part 325. Plastic materials such as PE, PA, PS, PP, ABS, PC, etc., have some elasticity, so a plastic part with an appropriate shape and thickness can sufficiently serve as an elastic body for 325. FIG. 3 shows the upper vertical touch layer 326 and the other vertical touch layers 327, 328 separately for ease of explanation, but these can be implemented as one piece or glued to each other and fixed.

Figures 4A, 4B:
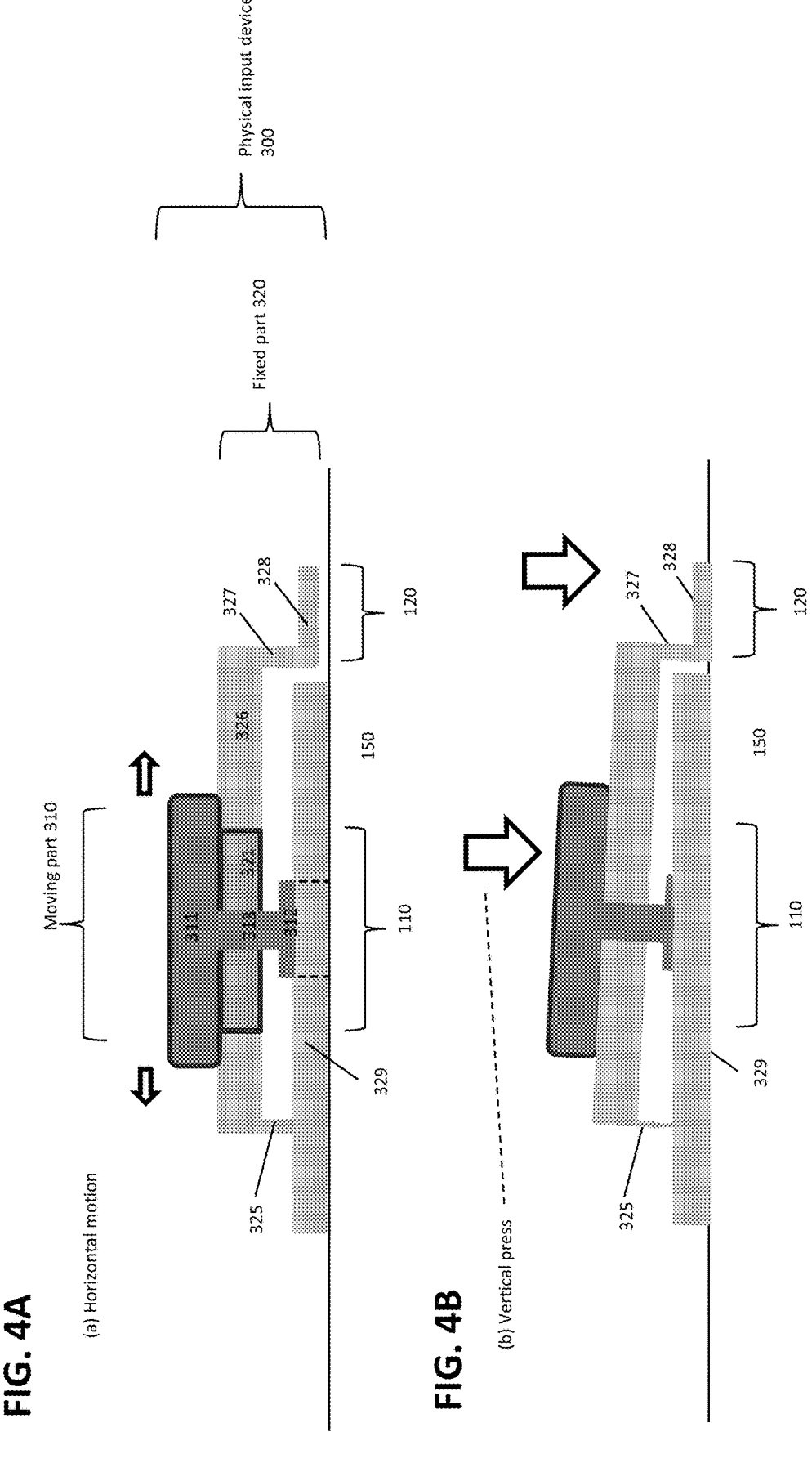
FIG. 4A and FIG. 4B are cross-sectional views of the physical input device of FIG. 3, according to some implementations.

FIG. 4A and FIG. 4B show the cross-sectional view of the input device 300. In some embodiments, the finger part 311 primarily controls the direction of the virtual joystick through horizontal movement on touch screen 150 using the touch part 312 as shown in FIG. 4A. In some embodiments, unless a significant downward force is applied to the finger part 311, the touch point 328 remains separated from the touch screen 150 due to the elasticity of component 325, and no touch input is registered at position 120. However, when a vertical downward force is applied to the finger part 311, as illustrated in FIG. 4B, the vertical touch layers 326, 327, and 328 underneath are also displaced downward. In some embodiments, this downward movement enables a simultaneous tap or touch input to be registered at position 120 on the touch screen 150. In some embodiments, if the trigger button at position 120 is assigned to operations such as firing in a game, the downward movement of the lower vertical touch layer or touch point 328 causes it to contact the touch screen at position 120, thereby activating the trigger button function.

In other words, in some embodiments, the user can manipulate the moving part 310 (specifically the finger part 311) horizontally to perform joystick operations related to direction or speed on the virtual joystick area 110, while simultaneously applying a downward force to the same moving part 310. In some embodiments, this downward force causes the touch point 328 to contact the touch screen at the horizontally fixed position 120, thereby generating a separate touch input.

In some embodiments, while it's possible to use an elastic member such as plastic material itself, rubber, or a spring, where the restoring force increases with deformation distance as the touch point 328 approaches the touch screen 150 from its neutral position, it is preferable to use a type of spring that remains undeformed until a certain downward force is applied, then suddenly deforms into a pressed state. Examples include leaf springs or snap domes (also known as tactile domes or metal domes, used to provide elasticity in tact switches or membrane switches). This allows the user to clearly perceive the pressing action through tactile feedback or sound. In some embodiments, snap domes can be implemented using metal, rubber, or silicone materials.

For instance, snap domes can be installed adjacent to the middle or lower vertical touch layers 327, 328. In some embodiments, when undeformed, snap domes keep the touch contact point 328 separated from the touch screen 150. In some embodiments, if insufficient downward force is applied to the finger part 311, the snap dome remains in its original dome shape, maintaining the separation between the touch point 328 and the touch screen 150. In some embodiments, when the force transmitted through the finger part 311 pressing the vertical touch layers exceeds a predetermined threshold, the snap dome suddenly collapses, lowering the touch point 328 and generating a touch input.

Figure 5A:
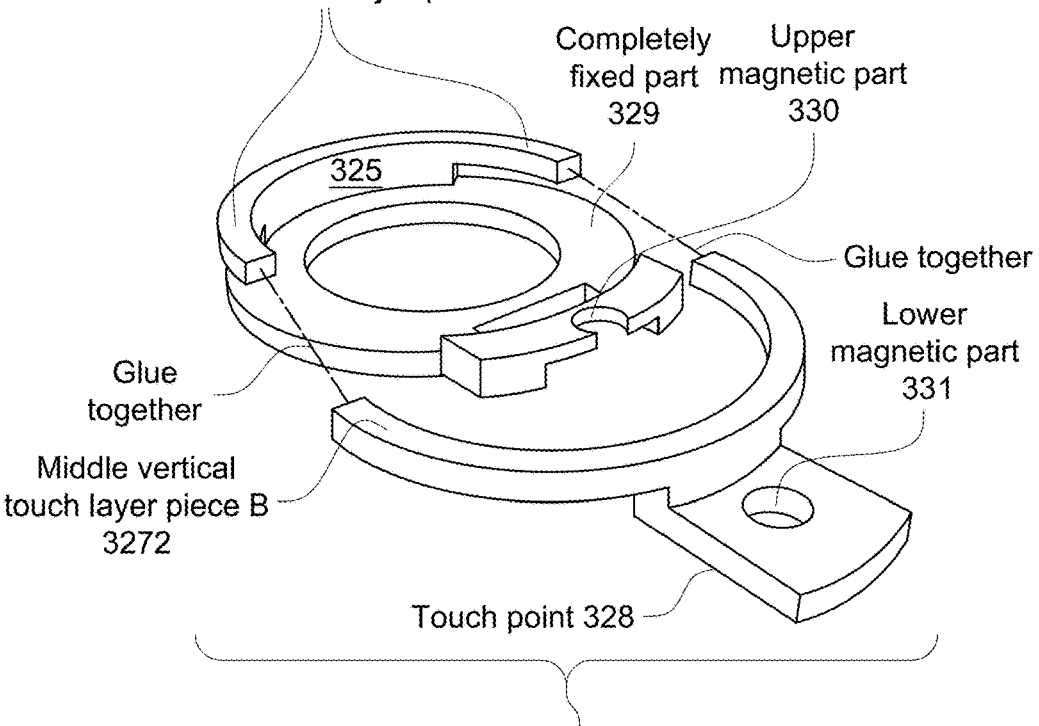
FIG. 5A to FIG. 5C are example middle vertical touch layer according to some implementations.
Figure 5B:
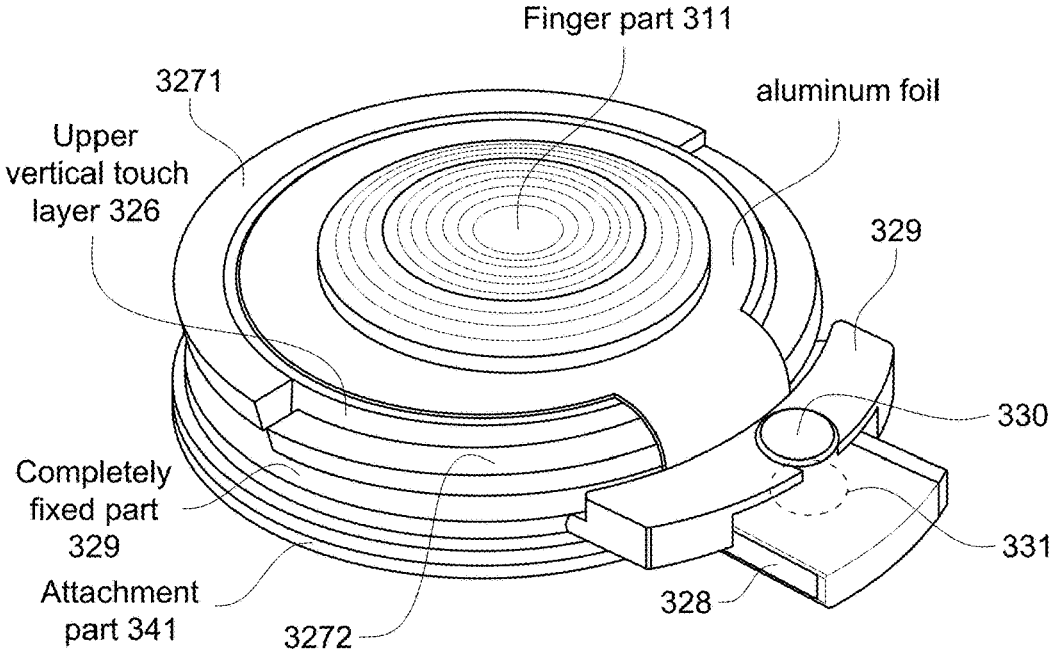
Figure 5C:
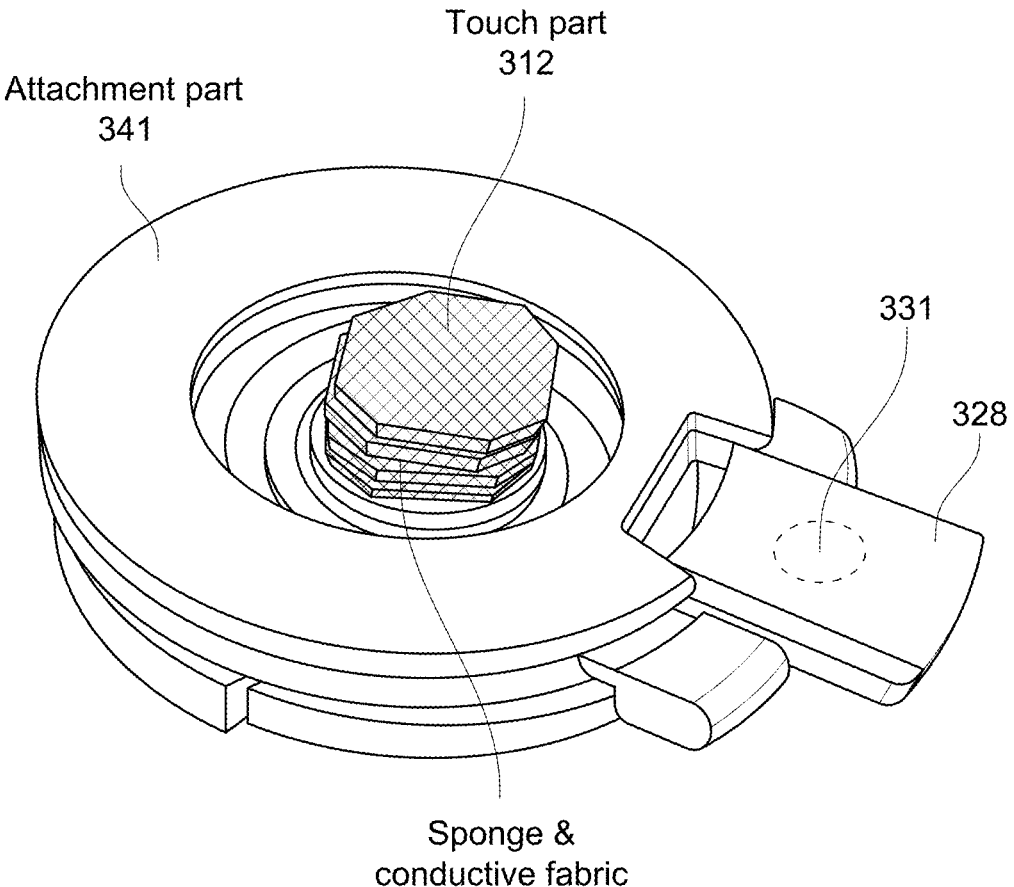

In some embodiments, instead of using snap domes for this sudden pressing action, two magnetic parts (magnets or ferromagnetic materials) that attract each other can be used. As shown in FIG. 5A to FIG. 5C, upper magnetic part 330 is installed as part of the completely fixed part 329 (which doesn't move even when the user presses the finger part), and lower magnetic part 331 is installed on the touch point 328, moving with it. In some embodiments, from the (vertically) neutral state without downward force on the moving part 310, when the pressing force is weak, magnetic parts 330, 331 are close or in contact, exerting a strong attractive force that prevents the touch point 328 from touching the touch screen 150 below. In some embodiments, the touch point 328 remains separated from and immobile relative to the touch screen 150 until a pressing force stronger than the attractive force between magnetic parts 330, 331 is applied. Then, in some embodiments, the touch point 328 moves towards the touch screen, magnetic parts 330 and 331 separate, causing a rapid weakening of the magnetic force between them, accelerating the movement of the touch point 328 towards and contact with the touch screen 150, thus conveying a tactile sensation and even sound to the user.

As shown in the proof of concept photos in FIG. 5B and FIG. 5C with aluminum foil, to enable capacitive touch input on the capacitive touch screen, in some embodiments, conductive materials are installed connecting the finger part 311, the upper and middle vertical touch layers (326, 3271, 3272), and the touch point 328, ensuring a conductive connection between the user's finger touching the finger part 311 and the touch point 328. This can apply equally to the configuration in embodiments shown in the previous figures. In some embodiments, if such a connection is not provided, the touch point 328 can be in contact with or connected to a conductor with sufficient capacitance of its own. For input on a resistive touch screen, the end of the touch point can be shaped as a stylus to effectively transfer pressure of finger on the finger part 311 to the touch screen.

Figure 7:
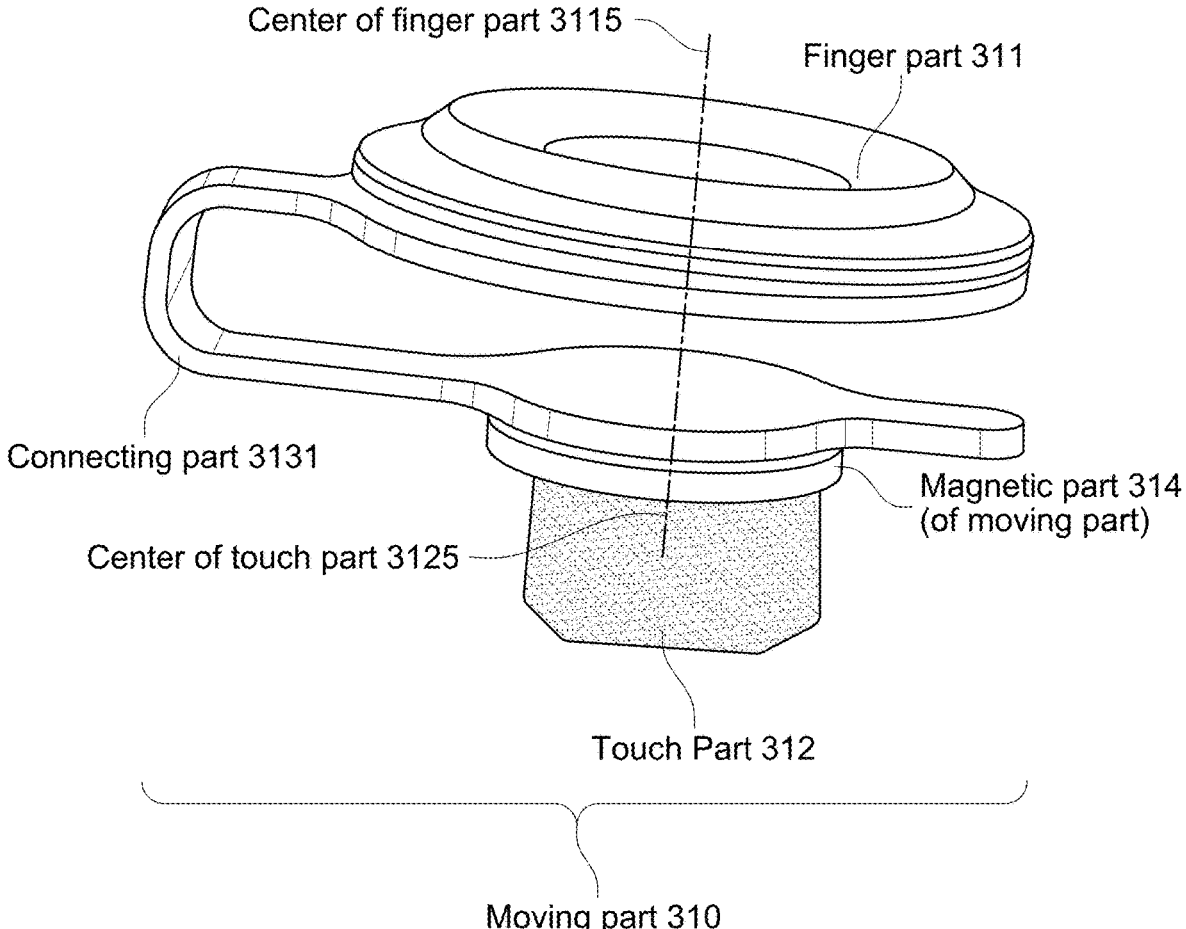
FIG. 7 is an example moving part according to some implementations.

In some embodiments, when the moving part 310 is pressed, the distance between the moving part 310 and the touch screen 150 changes due to downward motion. The touch part 312 of the moving part 310 can transmit touch input to the touch screen 150 regardless of this distance change. To achieve this, as shown in FIG. 5C with the sponge and conductive fabric forming the touch part 312. In some embodiments, the touch part 312 can have vertical flexibility or elasticity. In other words, in some embodiments, the touch part 312 can maintain contact with the touch screen 150 to generate touch input, independent of the vertical pressing or releasing of the moving part 310. To this end, the photo in FIG. 7 shows an example where the touch point 312 is composed of multiple layers of conductive materials with elasticity, such as sponge and conductive fabric. In some embodiments, vertical flexibility in the touch part 312 of the moving part 310 can be achieved using clastic conductive materials or by connecting rigid conductors with springs. FIG. 5A to FIG. 5C show an example where the middle vertical touch layer 327 from FIG. 3, FIG. 4A and FIG. 4B is split into piece A (3271) and B (3272) and glued, but these can also be implemented as a single piece or fixed together after assembly.

In FIGS. 3, 4A, 4B, and 5A to 5C, the vertical touch layers 326, 327, 328 are shown to move downward slightly with the fixed clastic member 325 acting as a rotation axis when the finger part 311 is pressed, causing the fixed elastic member 325 to bend and the touch point 328 to approach and touch the touch screen 150. However, this is not the only possible mechanism to move the touch point 328. Various mechanical mechanisms can be used to convert the force applied to the moving part 310 or 311 and the underneath fixed part 320 into vertical movement of the touch point 328 to touch the touch screen 150. For example, instead of a simple single-piece mechanism like in FIGS. 3, 4, and 5, structures like the scissor mechanism or butterfly hinge used in Apple's keyboards could be employed to make the fixed part 320 sink to achieve the touch effect of the touch point 328.

Figure 6A:
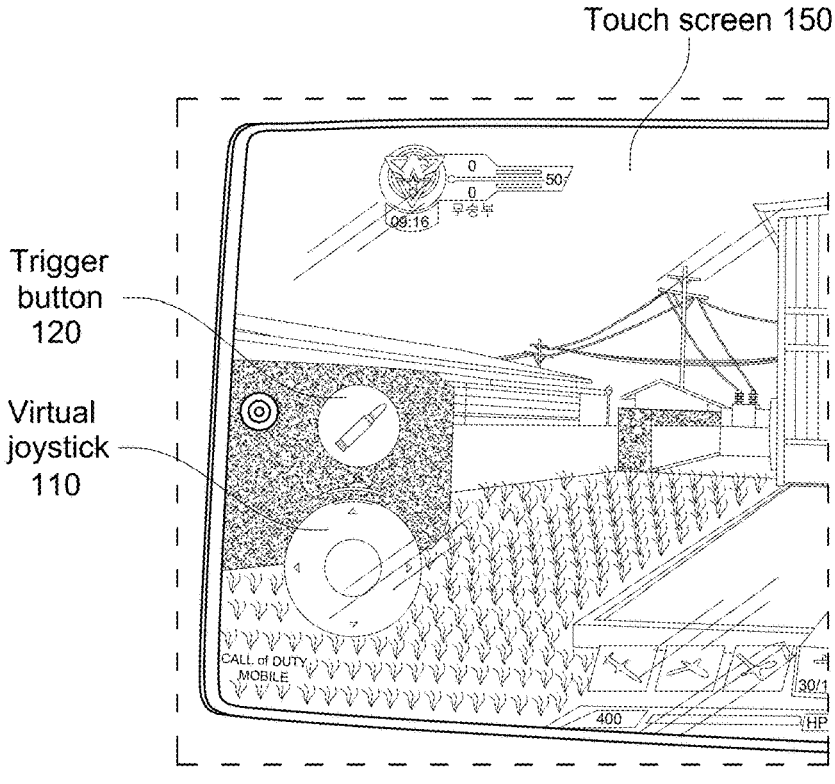
FIG. 6A to FIG. 6D are examples of using an input device attached to a device (e.g., mobile phone) according to some implementations.
Figure 6B:
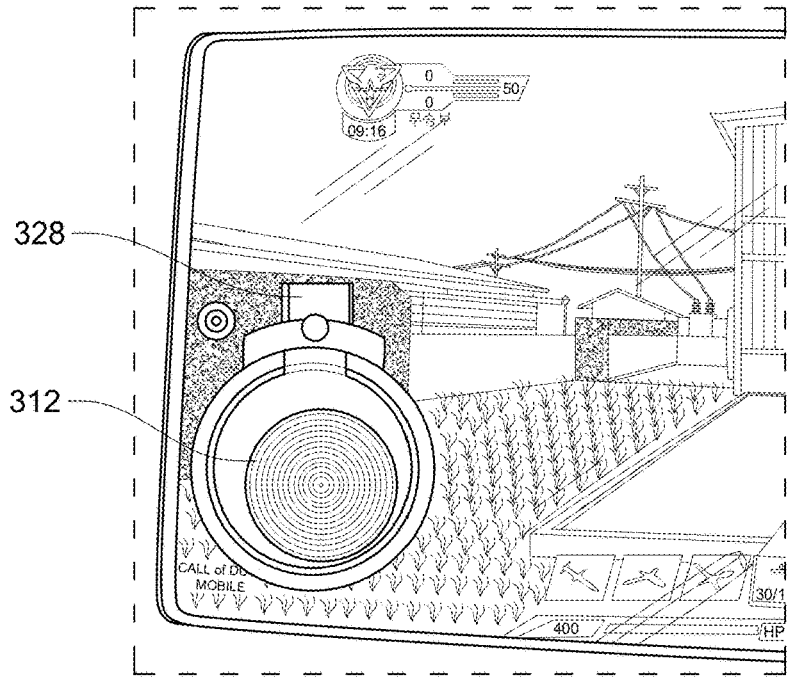
Figure 6C:
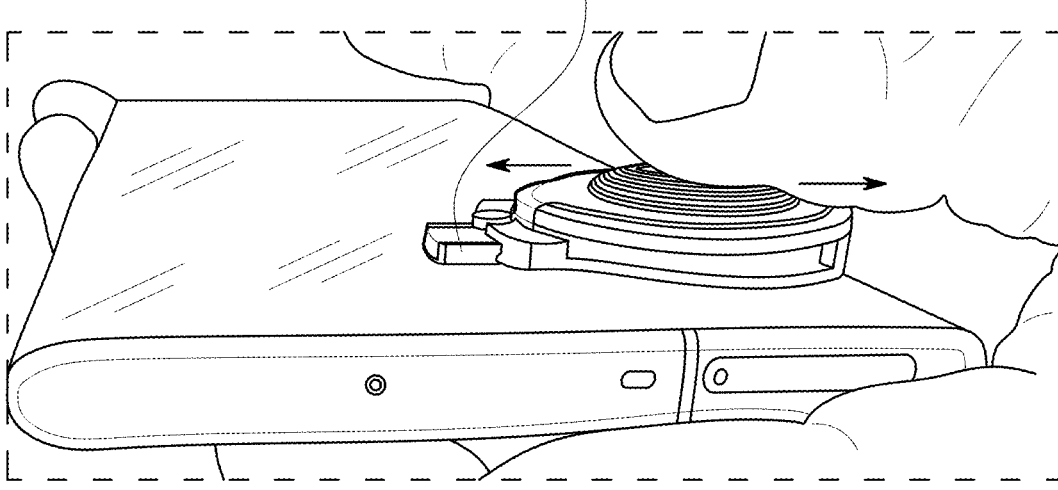
Figure 6D:
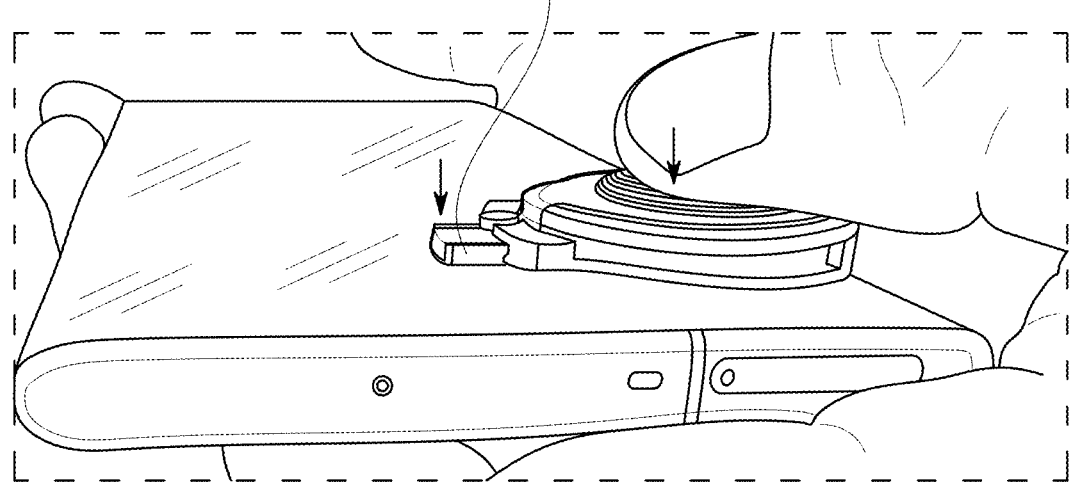

FIG. 6A to FIG. 6D show an actual example of using the input device 300 attached to a phone 100. Specifically, FIG. 6A shows the virtual joystick 110 and the trigger button 120 displayed on the phone. FIG. 6B shows the input device 300 of some embodiments of the present disclosure attached so that the touch point 328 and the touch part 312 are positioned over the virtual joystick 110 and trigger button 120 respectively. In FIG. 6C, the joystick is operated horizontally, and in FIG. 6D, it is pressed vertically to provide touch input to the trigger button 120.

The conventional phone-attached joysticks 200 shown in FIG. 2 can cause the following problems; 1) when a sticky protective film is applied to the phone's touch screen 150 where the touch part 212 is in contact: As the moving part 210 is returned to the center by the restoring force of the elastic member 230, the restoring force of the elastic member 230 weakens as the moving part 210 approaches the neutral position in the exact center, causing the moving part 210, including the touch part 212, to stop while being biased to one side before returning to the exact center. In this case, it may cause operational errors when the user pushes the joystick 200 the next moment. 2) the use of elastic member 230 limits the shape of the entire joystick to be generally rotationally-symmetric, i.e., it doesn't allow a virtual joystick shape 110 shown in FIG. 1 which is a union of a circle and a fan.

Figure 8A:
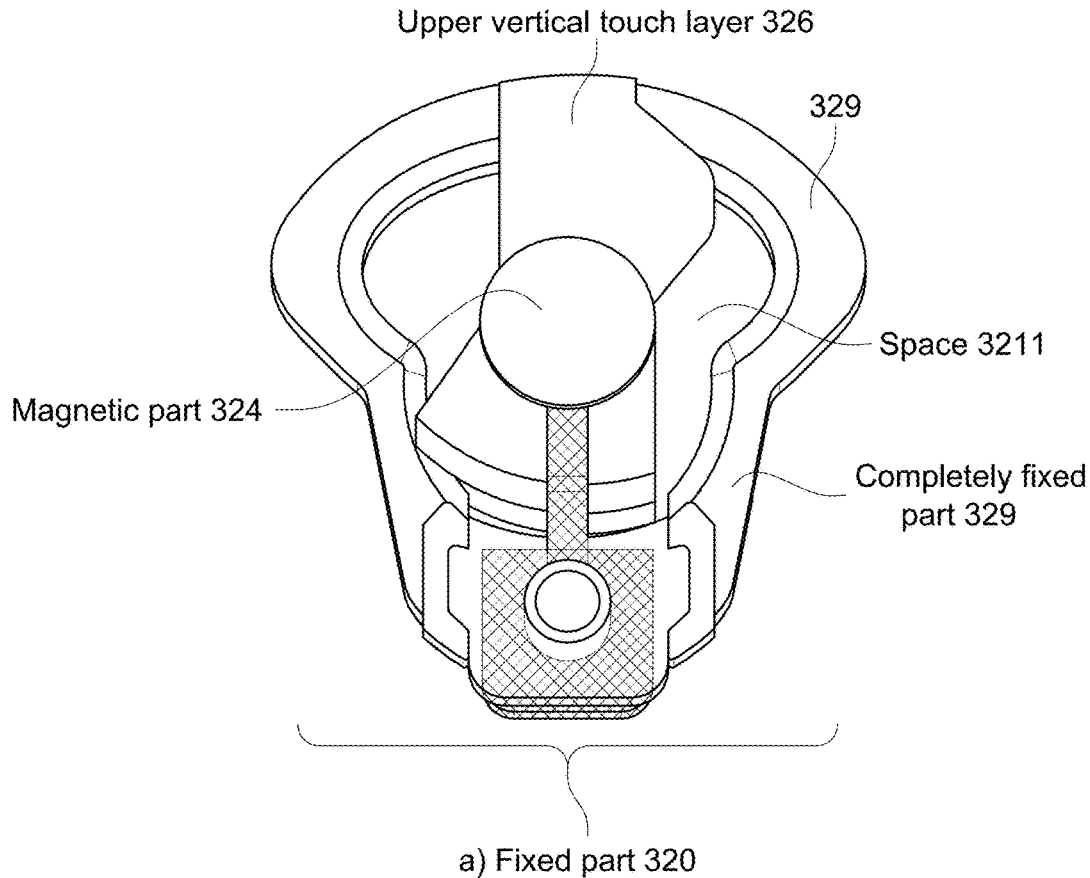
FIG. 8A to FIG. 8C are views of an example fixed part according to some implementations.
Figure 8B:
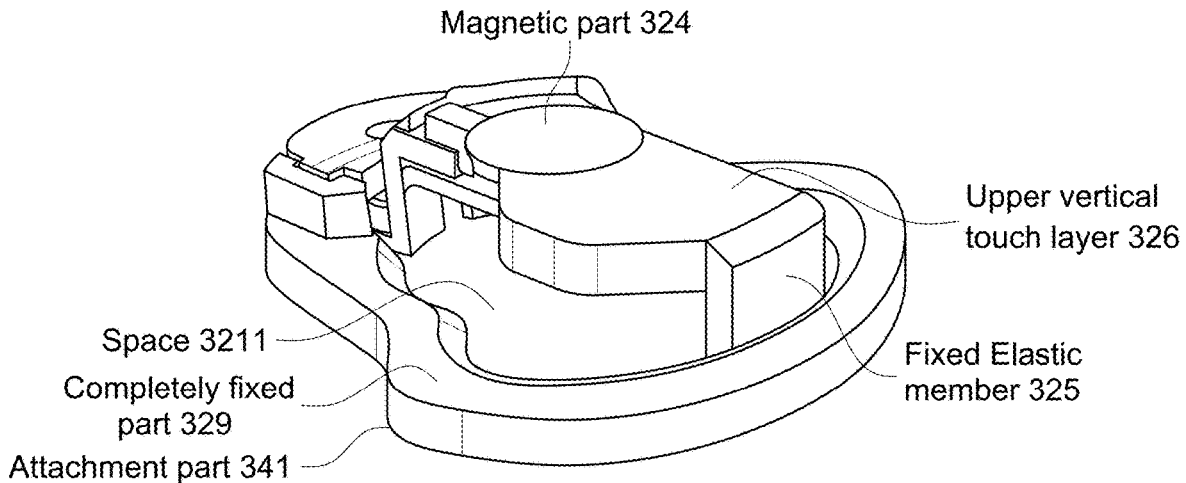
Figure 8C:
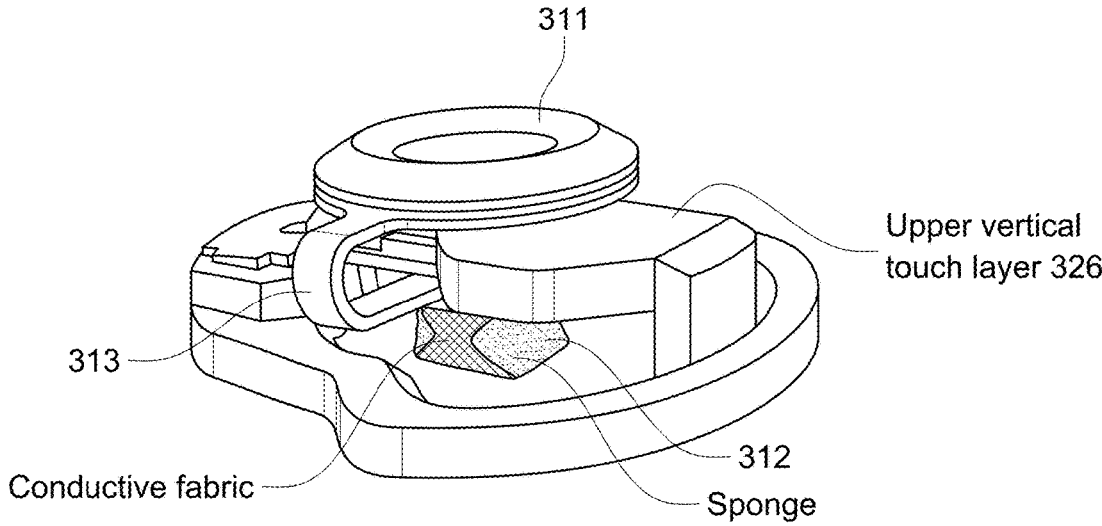

In some embodiments, to ensure that the moving part 310 always returns to the exact neutral position overcoming the friction of the phone screen applied to the touch part 312 even in irregular shaped virtual joystick 110, another embodiment of the present disclosure is configured as shown in the following FIGS. 7, 8A to 8C, and 9A to 9C. Instead of using the elastic member 230 between the moving part 210 and fixed part 220 in the conventional joystick 200, in some embodiments, the input device 300 according to some embodiments of the present disclosure uses the magnetic part 314 as shown in the moving part 310 of FIG. 7, and the magnetic part 324 installed in the fixed part 320 as shown in FIG. 8A to FIG. 8C. In some embodiments, the poles of the two magnetic parts 314 and 324 may be arranged so that different poles are close to each other to generate an attractive force between them so that with no external force, the moving part 310 returns to neutral position as shown in FIG. 10A. In the case of conversion joystick shown in FIG. 2 using elastic member 230, the force of restoration weakens as the distance of the moving part 210 approaches to the neutral position so it may stop before reaching the accurate neutral position. In some embodiments, with the configuration 300 disclosed in some embodiments of the present disclosure, as the moving part 310 gets closer to the neutral position, the force by which the magnetic part 314 is attracted by the magnetic part 324 of the fixed part 320 becomes stronger as it approaches the neutral position, so it can return accurately to the exact neutral position even if the resistance due to friction between the touch part 312 and the touch screen 150 is strong.

In some embodiments, to implement a input device utilizing this attractive force between magnetic parts 314 and 324, the input device 300 according to some embodiments of the present disclosure has the center of the finger part

2115 in the moving part 310 fixed above the center of the touch part 2125 as shown in FIG. 7. However, the finger part 311 and touch part 312 are not connected by the aforementioned middle shaft 313 of the joystick 200 that directly connects their centers, but the 311 and 312 are fixed to each other by a connecting at one corner with U shaped connecting 313, leaving the space between their centers 3115 and 3125 empty. In some embodiments, the connecting part 3131 is sufficiently far from the line connecting the centers 3115 and 3125, for example, it is preferably as far as the maximum clearance that the moving part 310 can move from the neutral position. In some embodiments, by fixing the finger part 311 parallel to and directly above the touch part 312, even if the moving part 310 rotates as the finger part 311 moves when pushed or pulled by the finger, the relative position where the touch occurs on the screen does not change relative to the position of the user's finger on the finger part 311. In some embodiments, a magnetic part 314 is installed in part of the moving part 310, to be attracted to the magnetic part 324 of the fixed part 320. In the example in FIG. 7, the magnet 314 is installed in the touch part 312, facing a different pole from the magnet 324 of the fixed part to exert an attractive force between them.

In some embodiments, the fixed part 320 in FIG. 8A to FIG. 8C has the attachment part 341 at the bottom of the complete fixed part 329 to attach itself to the phone surface, as in the aforementioned joysticks. However, in the fixed part shown in FIG. 8A to FIG. 8C, the internal space 3211 of the completely fixed part 329 where the touch part 312 of the moving part 310 can enter and touch the touch screen 150 is empty. Above that space, separated from the touch screen surface 150, the upper vertical touch layer 326 is installed with the magnetic part 324 fixed on it. In some embodiments, the magnetic part 324 exerts force on the magnetic part 314 of the moving part 310. That is, the completely fixed part 329 is a part that is fixed to the phone when the input device 300 is attached to the phone through the attachment part 341, and the magnetic part 324 of the fixed part 320 generates a force for the moving part 310 to return to the neutral position. In some embodiments, upper vertical touch layer 326 in FIG. 8A to FIG. 8C preferably has a relatively wide horizontal plane area to support the bottom of the finger part 311 to move stably along the plane area when the finger part 311 is pushed or pulled horizontally by the user's finger. In some embodiments, the completely fixed part 329 acts as a movement limiting part that limits the range of movement of the touch part 312 inside the space 3211, preventing it from escaping outward.

FIG. 8C shows the combined input device with fixed part 320 and the moving part 310 together so that the upper vertical touch layer 326 comes between the touch part 312 and the finger part 311 of the moving part, and making their magnetic parts 314 and 324 attract each other. In some embodiments, since the upper vertical touch layer 326 with magnetic part 324 is formed at a different height or layer without interfering with the area where the touch part 312 touches and moves on the touch screen 150 (space 3211), the moving part 310 can easily return to the neutral position by the attractive force between the magnetic parts 314 and 324. The space 3211 shown in FIG. 8A to FIG. 8C is a configuration that combines a circle and a fan to cover the virtual joystick 110 as in FIG. 1. In some embodiments, the touch part 312 in the moving part 310 in FIG. 8C is made of sponge and conductive fabric material that can stretch, so that the moving part 310 can not only move horizontally on the touch screen 150 but also be pressed vertically. In some embodiments, the touch part 312 maintains continuous touch on the touch screen 150 regardless of whether the moving part 310 is pressed or not. This is a structure that can perform both joystick function and vertical pressing function with one finger part 311.

Figure 9A:
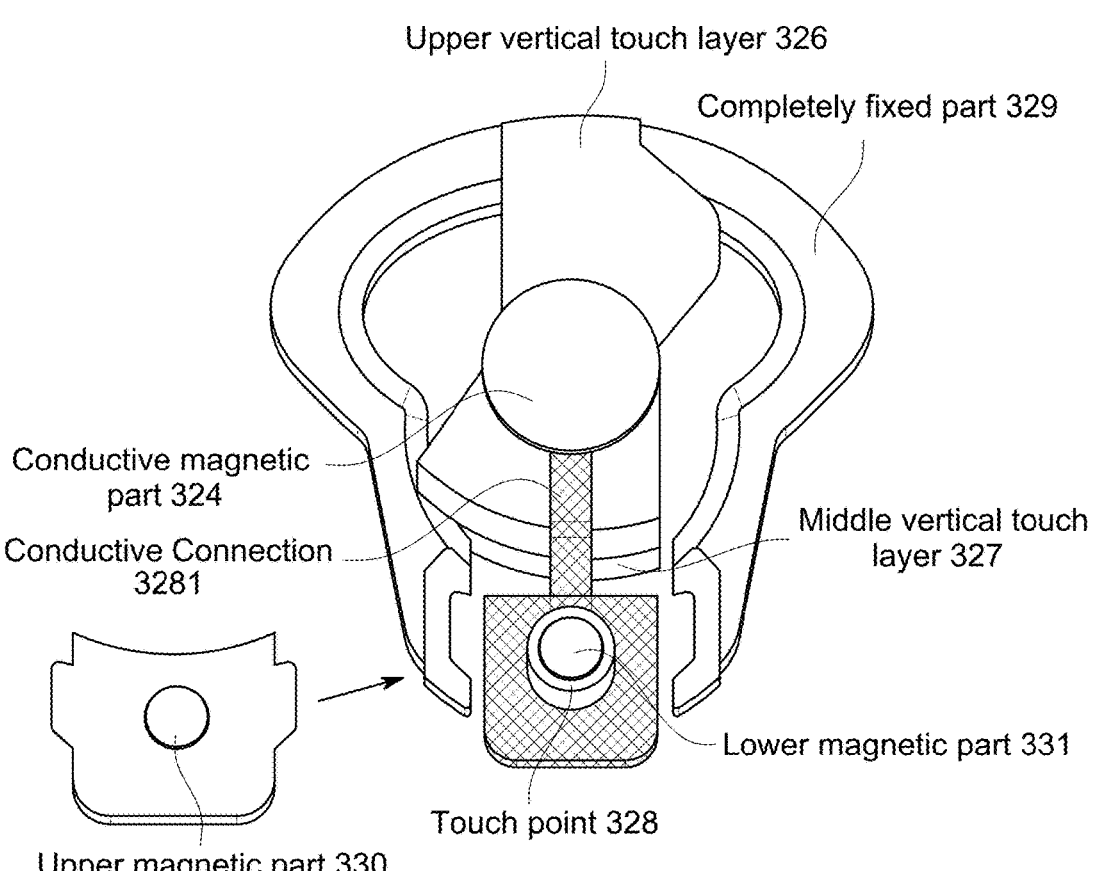
FIG. 9A to FIG. 9C are views of an example fixed part according to some implementations.
Figure 9B:
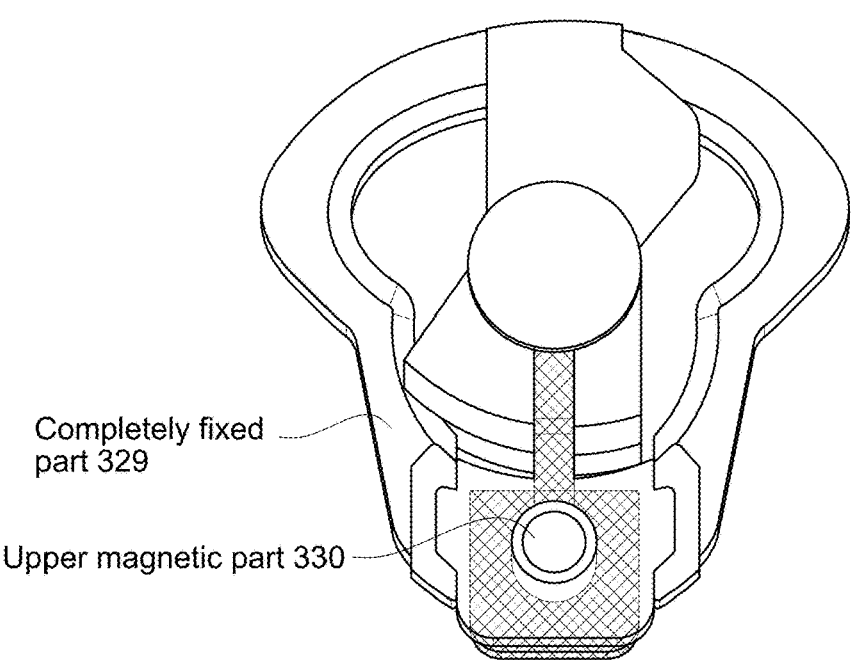
Figure 9C:
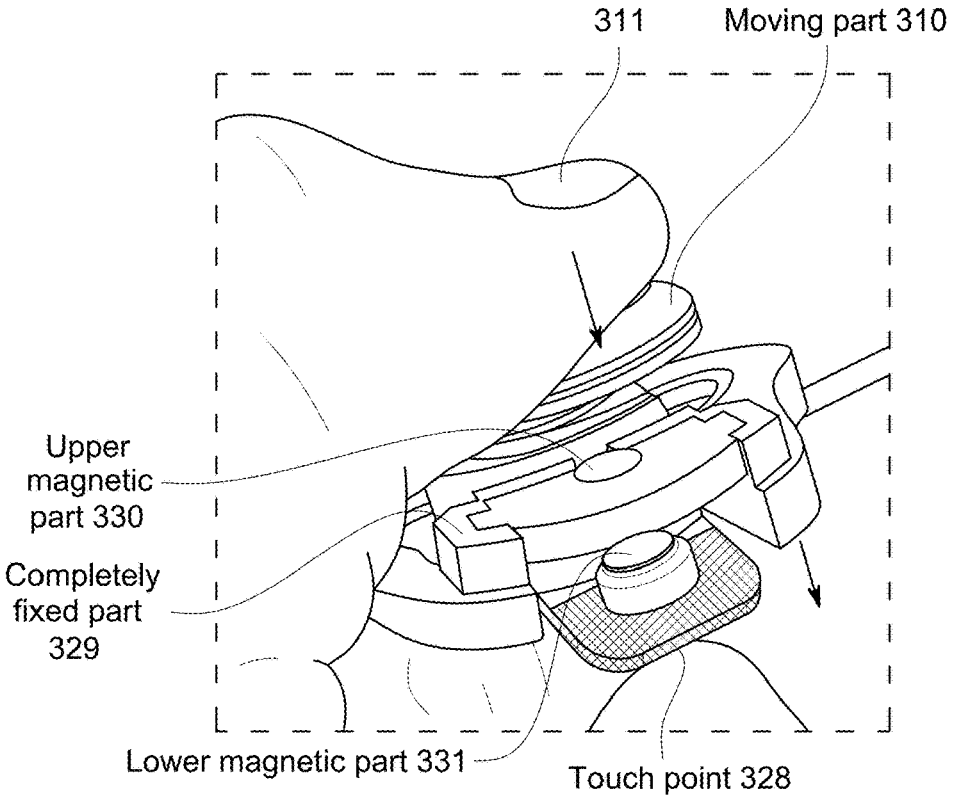
Figures 10A, 10B:
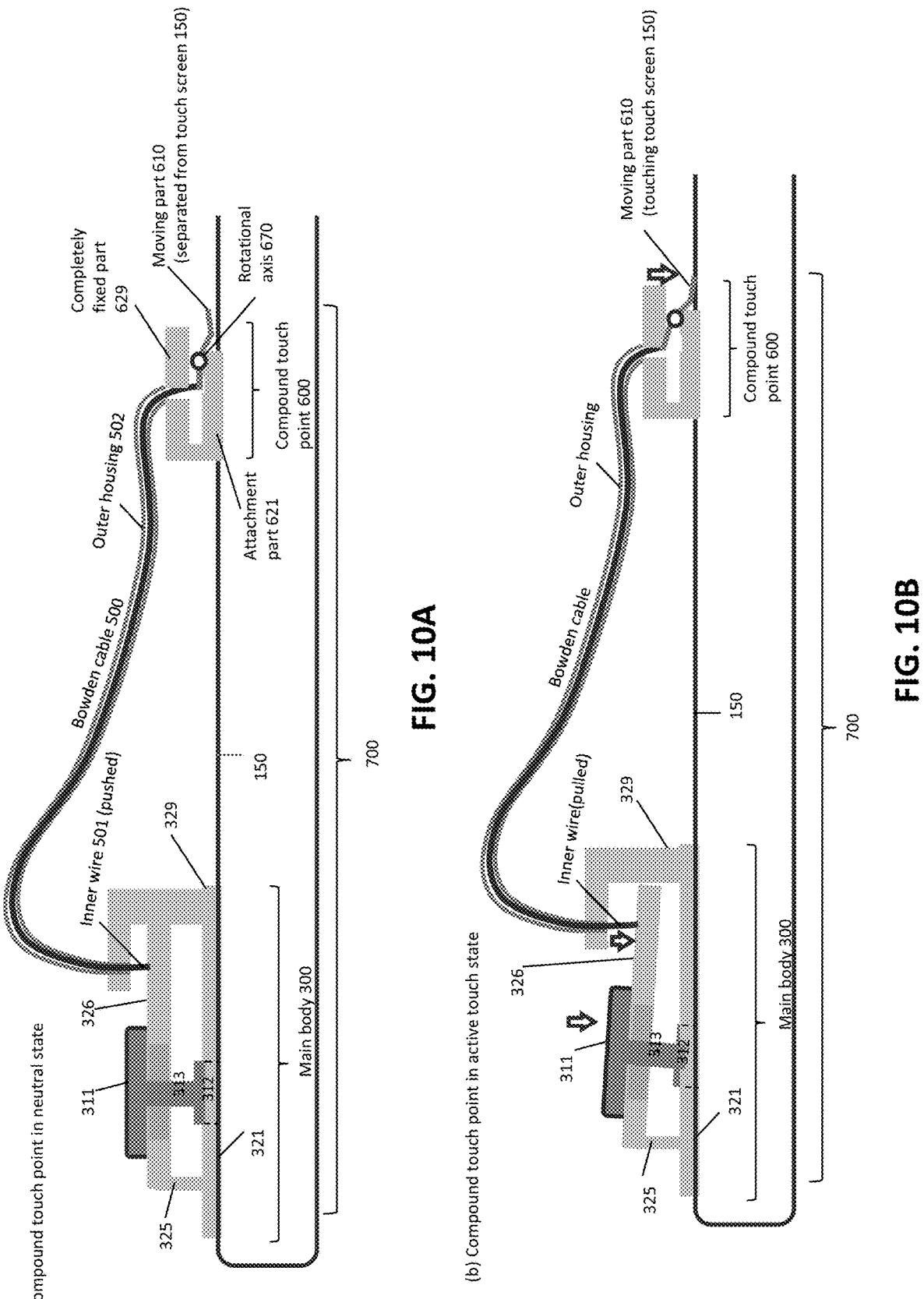
FIG. 10A and FIG. 10B are an example electronic device including a physical input device according to some implementations.

The input device is again shown in FIG. 9A to FIG. 9C, this time, highlighting its part to vertically touch the screen. In some embodiments, the input device has the vertical touch layers 326 and 327 and 328 so that when the finger part 311 is pressed vertically towards the touch screen 150, the vertical touch layers are displaced downward to cause touch input on the touch screen button 120. In some embodiments, at this time, the input device 300 can have the conductive touch point 328 and this touch point can be conductively connected to the conductive finger part 311 and eventually to user's finger as described in FIG. 5A to FIG. 5C. FIG. 9A shows conductive connection 3281 and conductive magnetic part 324 to have the conductive connection from the finger part 311 to touch point 328.

In some embodiments, the lower magnetic part 331 is provided on the touch point 328 that moves vertically with other vertical touch layers 326 and 327 with user pressure on moving part 310 as shown in FIG. 9C. In some embodiments, when the user is not pressing, the touch point 328 may or should be sufficiently far from the touch screen so as not to cause touch input. To return the touch point 328 to this vertically neutral position, upper magnetic part 330 is provided glued to the completely fixed part 329 as shown in FIG. 9A.

Through the above-mentioned embodiments of the present disclosure, the input devices 300 has been disclosed that allows for horizontal direction control while simultaneously enabling a separate touch through a vertical pressing motion of the input device. In these embodiments, when the horizontally moving finger part 311 is pressed vertically, the fixed vertical touch layer 326 underneath is displaced downward, causing the touch point 328 on the other side of the rigid vertical touch layer to make contact with touch screen 150.

A cross-sectional view of another embodiment 700 of the present disclosure is shown in FIG. 10A and FIG. 10B. Main body 300 in FIG. 10A and FIG. 10B operates similarly to the cross-sectional view of the input device 300 in FIG. 4A and FIG. 4B, but the connection between the upper vertical touch layer 326 that is pressed beneath the finger part 311 and the compound touch point 600 that actually touches the touch screen is made using a Bowden cable 500. In some embodiments, the Bowden cable 500 transmits the vertical downward pressing or neutral position returning motion of the vertical touch layer 326 to the compound touch point 600.

Specifically, as shown in FIG. 10A and FIG. 10B, one end of the Bowden cable 500, composed of a flexible inner wire 501 and a flexible outer housing 502 (such as a plastic tube), is placed in the main body 300 of the input device 700 where the finger part 311 is located, and the other end is placed at the compound touch point 600. In some embodiments, the inner wire 501 of the Bowden cable 500 is connected to the vertical touch layer 326 in the main body 300, while the outer housing 502 is connected to the completely fixed part 329 of the main body. This arrangement converts the neutral position returning motion caused by the attractive force of the aforementioned attracting magnetic parts 330 and 331 within the fixed part 320 and/or by the restoring force of the fixed elastic part 325 into push motion of the inner wire 501 within the outer housing 502 (FIG. 10A). In some embodiments, this arrangement also converts the downward pressing motion caused by user's finger through the finger part 311 into pull motion of the inner wire 501 within the outer housing 502 (FIG. 10B).

In some embodiments, the compound touch point 600 is also equipped with a separate attachment part 621 that adheres to the touch screen 150. It has a completely fixed part 629 that is fixed to the phone in conjunction with the attachment part 621, and the moving part 610 that moves to make contact with or separate from the touch screen 150 to generate touch input. In some embodiments, the outer housing 502 of the Bowden cable 500 is connected to the completely fixed part 629 of the touch point 600, while the inner wire 501 is connected to the moving part 610, allowing the moving part 610 to receive the push or pull motion of the inner wire 501 generated by the vertical touch layer 326 in the main body 300.

In the implementation shown in FIG. 10A, the moving part 610 is designed to be separated from the touch screen 150 in the neutral state when the inner wire 501 is pushed in the main body 300. In some embodiments, when the finger part 311 is pressed and the inner wire is pulled as in FIG. 10B, the moving part 610 make contact with the touch screen 150 to generate touch input because the portion of the moving part 629 that touches the touch screen moves in opposite direction of the inner wire 501 due to the rotational axis 670. Consequently, when the finger part 311, e.g., the vertical touch layer 326 is pressed as in FIG. 10B, the moving part 610 generates a touch input, and when the vertical touch layer 326 returns to its neutral position, it separates from the touch screen (FIG. 10A).

In some embodiments, the Bowden cable 500 or one of its parts is made of conductive material to transmit the capacitance of the user's finger to the moving part 610 of the compound touch point 600. By using this conductive and flexible Bowden cable 500, even if the relative positions of the virtual joystick 110 and trigger button 120 on the touch screen change, the input device 700 according to some embodiments of the present disclosure can still be used by moving the Bowden cable and attaching the compound touch point 600 to the desired location on touch screen.

FIG. 11 is an example flowchart for performing a process 1100 of providing a physical input device for use with a touch screen of an electronic device, according to some implementations. The process 1100 may be performed by attaching a physical input device to the electronic device (Step 1102). In some embodiments, the physical input device may have a fixed part and a moving part. The moving part may be moved horizontally relative to the fixed part to generate a first touch input on a first area of the touch screen (Step 1104). In some embodiments, the moving part may be pressed vertically to generate a second touch input on a second area of the touch screen, the second area being separate from the first area and fixed on touch screen (Step 1106). In some embodiments, magnetic attraction may be used between a first magnetic part in the moving part and a second magnetic part in the fixed part to return the moving part to a neutral position by layering the first and second magnetic parts in different elevations over the touch screen. In some embodiments, pressing the moving part vertically may cause one or more vertical touch layers in the fixed part to move towards the touch screen.

A list of reference numbers includes as follows:
Electronic device 100;
Virtual joystick 110;
Trigger button 120;
Touch screen 150;
Center of virtual joystick 111;

Radius of virtual joystick 112;
Distance 113;
Physical input device 200;
Moving part 210; Finger part 211;
Touch part 212;
Middle shaft 213;
Fixed part 220;
Attachment part 221;
Hole 222;
Upper fixed part 227;
Lower fixed part 229;
Elastic member 230;
Physical input device (main body) 300;
Moving part 310;
Finger part 311;
Center of finger part 3115;
Touch part 312;
Middle shaft 313;
Magnetic part 314, 324;
Connecting part 3131;
Center of touch part 3125;
Fixed part 320;
Hole 321;
Vertical movement gap 322;
Space 3211;
Fixed elastic member 325;
Upper vertical touch layer 326;
Middle vertical touch layer 327;
Middle vertical touch layer piece A 3271;
Middle vertical touch layer piece B 3272;
Touch point (or lower vertical touch layer) 328;
Conductive Connection 3281;
Completely fixed part 329;
Upper magnetic part 330;
Lower magnetic part 331;
Attachment Part 341;
Bowden cable 500;
Outer housing 502;
Compound touch point 600;
Moving part 610;
Attachment part 621;
Completely fixed part 629;
Rotational axis 670;
Input device 700;

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A physical input device for use with a touch screen of an electronic device, comprising:
a fixed part attachable to the electronic device;
a moving part movable relative to the fixed part, the moving part including:
a finger part for receiving user input;
a touch part for contacting the touch screen;
a first magnetic part associated with the moving part; and
a second magnetic part associated with the fixed part,
wherein the first and second magnetic parts are configured to generate an attractive force to return the moving part to a neutral position, and
wherein the moving part is configured to:
move horizontally to generate a first touch input on a first area of the touch screen; and move vertically to generate a second touch input on a second area of the touch screen, the second area being separate from the first area.

2. The physical input device of claim 1, wherein the fixed part comprises:
a completely fixed part attachable to the electronic device;
one or more vertical touch layers movable relative to the completely fixed part; and
a fixed elastic member connecting the completely fixed part and the one or more vertical touch layers.

3. The physical input device of claim 2, wherein the one or more vertical touch layers include a touch point configured to contact the touch screen when the moving part is pressed vertically.

4. The physical input device of claim 1, wherein the moving part comprises an elastic conductive material to maintain contact with the touch screen during vertical movement of the moving part.

5. The physical input device of claim 1, further comprising:
a snap dome mechanism configured to provide tactile feedback when the vertical touch layers of the fixed part are pressed vertically.

6. The physical input device of claim 1, further comprising:
magnetic parts configured to provide tactile feedback when the vertical touch layers of the fixed part are pressed vertically.

7. The physical input device of claim 1, further comprising:
a Bowden cable connecting the fixed part to a compound touch point, the compound touch point being separately attachable to the touch screen.

8. A method of providing input to a touch screen of an electronic device, comprising:
attaching a physical input device to the electronic device, the physical input device having a fixed part and a moving part;
moving the moving part horizontally relative to the fixed part to generate a first touch input on a first area of the touch screen; and
pressing the moving part vertically to generate a second touch input on a second area of the touch screen, the second area being separate from the first area and fixed on touch screen; and
using magnetic attraction between a first magnetic part in the moving part and a second magnetic part in the fixed part to return the moving part to a neutral position by layering the first and second magnetic parts in different elevations over the touch screen.

9. The method of claim 8, wherein pressing the moving part vertically causes one or more vertical touch layers in the fixed part to move towards the touch screen.

10. A physical input device for use with a touch screen of an electronic device, the touch screen displaying a virtual joystick and a trigger button, the physical input device comprising:
an input device comprising a moving part and a fixed part, wherein
the fixed part is attached to the electronic device and restricts movement of the moving part,
the moving part is configured to transfer a movement of a finger of a user placed on the moving part, to a touch input on the touch screen,
in response to the finger placed on the moving part moving horizontally, the moving part is configured to cause a touch input on the virtual joystick, and in response to the moving part being pressed vertically by the finger, the moving part is configured to displace the fixed part downward to cause a touch input on the trigger button.

\* \* \* \* \*